United States Patent
Yang et al.

(10) Patent No.: US 7,123,316 B1
(45) Date of Patent: Oct. 17, 2006

(54) BACKLIGHT MODULE AND REFLECTIVE COVER USED THEREIN

(75) Inventors: Xing-Peng Yang, Beijing (CN); Ying-Bai Yan, Beijing (CN); Guo-Fan Jin, Beijing (CN)

(73) Assignees: Tsinghua University, Beijing (CN); Hon Hai Precision Industry Co., LTD, Taipei Hsien (TW)

( * ) Notice: Subject to any disclaimer, the term of this patent is extended or adjusted under 35 U.S.C. 154(b) by 0 days.

(21) Appl. No.: 11/414,598

(22) Filed: Apr. 28, 2006

(30) Foreign Application Priority Data

Sep. 5, 2005    (CN)    ........................ 200510037129

(51) Int. Cl.
*G02F 1/1335* (2006.01)
*F21V 7/04* (2006.01)

(52) U.S. Cl. .................... 349/65; 349/64; 362/341; 362/609

(58) Field of Classification Search ............... 349/61, 349/62, 64, 65, 67; 362/26, 27, 296, 341, 362/346, 347, 349, 350, 606, 609, 612, 613
See application file for complete search history.

(56) References Cited

U.S. PATENT DOCUMENTS

| | | | | |
|---|---|---|---|---|
| 5,335,152 | A | * | 8/1994 | Winston .................... 362/217 |
| 2004/0027041 | A1 | * | 2/2004 | Nishikawa ................. 313/110 |
| 2006/0098453 | A1 | * | 5/2006 | Kuo .......................... 362/609 |

OTHER PUBLICATIONS

Roland Winston and Harald Ries; "Nonimaging reflectors as functionals of the desired irradiance"; pp. 1902-1908, J. Opt. Soc. Am. A vol. 10, No. 9 Sep. 1993.

* cited by examiner

*Primary Examiner*—Toan Ton
*Assistant Examiner*—Tai Duong
(74) *Attorney, Agent, or Firm*—Jeffrey T. Knapp

(57) ABSTRACT

A backlight module (30) includes a light source (42) for emitting light, a light guide plate (50), and a reflective cover (41). The light guide plate includes a light incidence surface (51), a light-emitting surface (53) connecting with the light incidence surface, and a bottom surface (52) opposite to the light-emitting surface. The light source faces the light incidence surface. The reflective cover includes a reflective unit having two reflective surfaces (411, 412) defining a space with a bottom. The light source is accommodated in the bottom of the space. A cross-sectional profile of the reflective surfaces is defined by an equation in a polar coordinate $\rho(\phi)$. The equation is:

$$\begin{cases} \int_{\pi/2}^{\varphi-\theta} \rho(\varphi)\sin(\varphi-\theta)d(\varphi-\theta) = \int_0^\theta \frac{1}{\cos^2(\theta)}d\theta \\ \rho(\varphi) = \rho_0\{\cos(\theta/2)/[\cos(\varphi-\theta)/2]\}^2, \end{cases}$$

wherein, $\rho$ represents a polar axis of the polar coordinate, $\phi$ represents a clockwise angle of the polar coordinate, and $\theta$ represents an anti-clockwise divergence angle of the light.

18 Claims, 7 Drawing Sheets

(PRIOR ART)

FIG. 7
(PRIOR ART)

BACKLIGHT MODULE AND REFLECTIVE COVER USED THEREIN

BACKGROUND

1. Field of the Invention

The present invention relates to a backlight module and a reflective cover used in the backlight module and, more particularly, to a backlight module for providing a planar illuminating light to a liquid crystal display (LCD) panel.

2. Discussion of the Related Art

In recent years, LCD devices, such as liquid crystal monitors, and liquid crystal TVs have become widely used. A typical LCD device includes an LCD panel and a backlight module positioned under the LCD panel for supplying light thereto.

Figure 6:
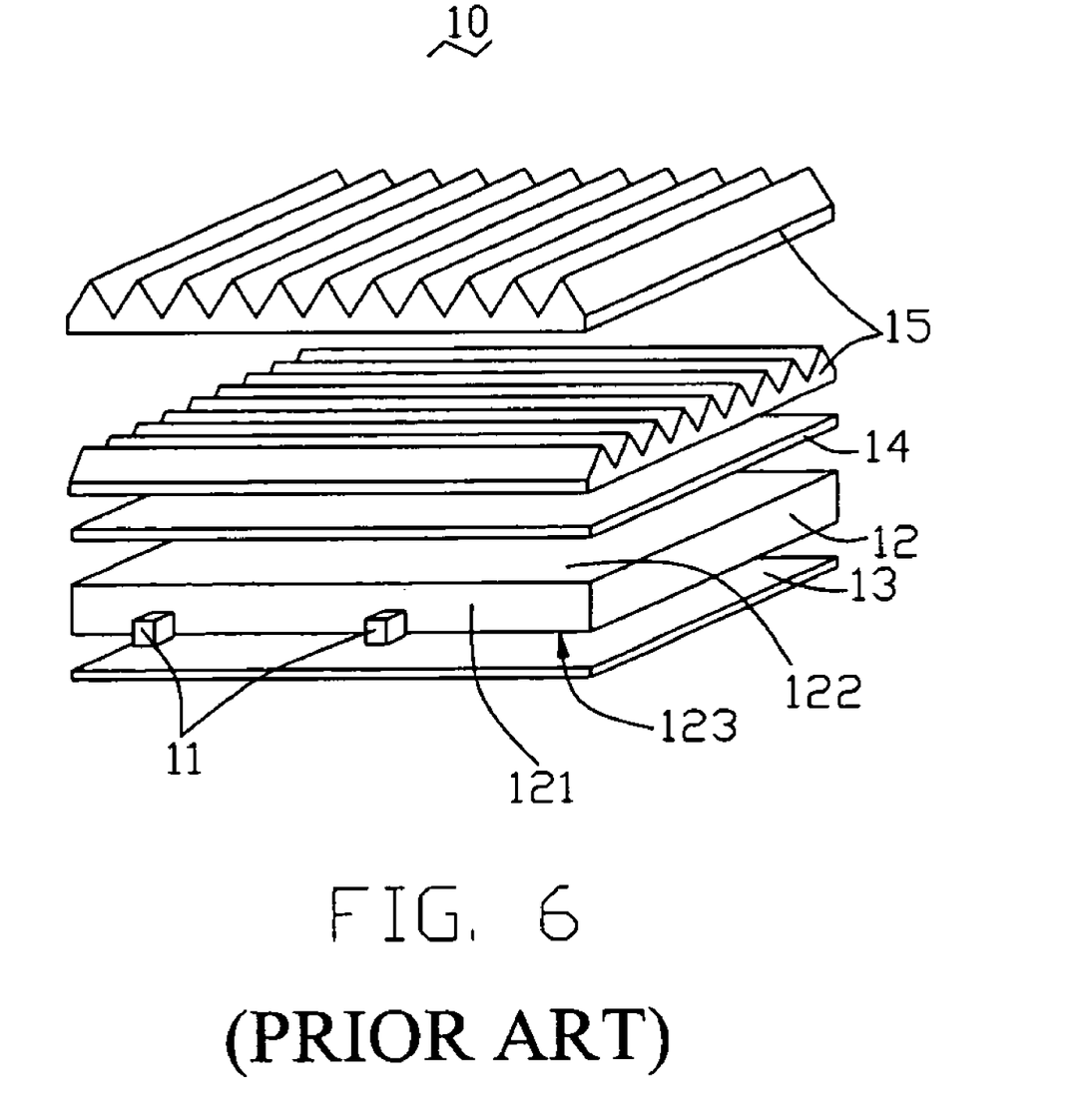
FIG. 6 is an exploded, perspective view of a typical backlight module.

Referring to FIG. 6, a typical backlight module 10 includes two point light sources 11, a light guide plate (LGP) 12, a reflective sheet 13, a diffusing sheet 14, and two light condensers 15. The two point light sources 11 are generally light-emitting diodes (LEDs). The LGP 12 includes a light incidence surface 121, a light-emitting surface 122 connecting with the light incidence surface 121, and a bottom surface 123 facing the light-emitting surface 122. The two point light sources 11 are placed at the light incidence surface 121 of the LGP 12. The reflective sheet 13, the LGP 12, the diffusing sheet 14, and the two light condensers 15 are arranged in that order.

In operation, the point light source 11 emits light. The light is transmitted into the LGP 12 through the light incidence surface 121. The LGP 12 is used for guiding the light to exit from the light-emitting surface 122 thereof. The reflective sheet 13 reflects a portion of the light exiting from the bottom surface 123 of the LGP 12. The reflected portion of the light is thus redirected to exit from the light-emitting surface 122. The light exiting from the light-emitting surface 122 passes through the diffusing sheet 14 and the two light condensers 15 in sequence. The two light condensers 15 are configured for collimating diffused light emitting from the diffusing sheet 14. Thus, the backlight module 10 can generate a planar illuminating light with a high brightness.

Figure 7:
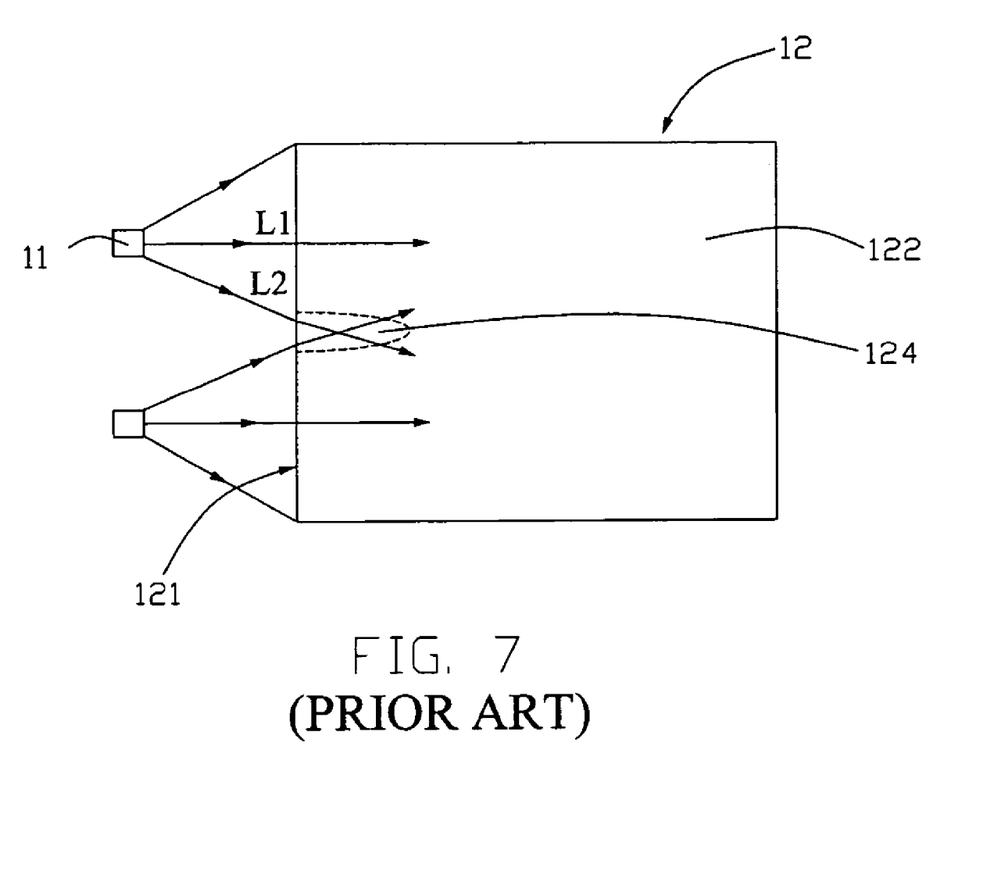
FIG. 7 is a schematic, plan view of light sources and an LGP of FIG. 6, showing essential optical paths thereof.

Referring to FIG. 7, each point light source 11 has a limited illuminating space. Light beam L1 in the center of the illuminating space is substantially perpendicular to the light incidence surface 121, and can exit from a first portion of the light-emitting surface 122 opposite to the point light source 11. Light beam L2 in the border of the illuminating space is not perpendicular to the light incidence surface 121, and can exit from a second portion of the light-emitting surface 122 opposite to a position between the two point light sources 11. There is a dark region 124 (defined by a broken line in FIG. 7) to which the light emitting from the two point light sources 11 hardly reaches. The dark region 124 is displayed on the light-emitting surface 122, thus it can be seen that the backlight module 10 does not provide uniform brightness.

What is needed, therefore, is a backlight module that can provide uniform brightness.

SUMMARY

A backlight module according to one preferred embodiment includes a light source for emitting light, a light guide plate, and a reflective cover. The light guide plate includes a light incidence surface, a light-emitting surface connecting with the light incidence surface, and a bottom surface opposite to the light-emitting surface. The light source faces the light incidence surface. The reflective cover includes a reflective unit having two reflective surfaces defining a space with a bottom. The light source is accommodated in the bottom of the space. A cross-sectional profile of the reflective surfaces is defined by an equation in a polar coordinate $\rho(\phi)$. The equation is:

$$\begin{cases} \int_{\pi/2}^{\varphi-\theta} \rho(\varphi)\sin(\varphi-\theta)d(\varphi-\theta) = \int_0^\theta \frac{1}{\cos^2(\theta)}d\theta \\ \rho(\varphi) = \rho_0\{\cos(\theta/2)/[\cos(\varphi-\theta)/2]\}^2, \end{cases}$$

wherein, $\rho$ represents a polar axis of the polar coordinate, $\phi$ represents a clockwise angle of the polar coordinate, and $\theta$ represents an anti-clockwise divergence angle of the light.

A reflective cover according to one preferred embodiment includes a reflective unit having two reflective surfaces defining a space with a bottom for accommodating a light source. A cross-sectional profile of the reflective surfaces is defined by an equation in a polar coordinate $\rho(\phi)$. The equation is:

$$\begin{cases} \int_{\pi/2}^{\varphi-\theta} \rho(\varphi)\sin(\varphi-\theta)d(\varphi-\theta) = \int_0^\theta \frac{1}{\cos^2(\theta)}d\theta \\ \rho(\varphi) = \rho_0\{\cos(\theta/2)/[\cos(\varphi-\theta)/2]\}^2, \end{cases}$$

wherein, $\rho$ represents a polar axis of the polar coordinate, $\phi$ represents a clockwise angle of the polar coordinate, and $\theta$ represents an anti-clockwise divergence angle of light emitted from the light source.

Other advantages and novel features will become more apparent from the following detailed description of the present backlight module, when taken in conjunction with the accompanying drawings.

BRIEF DESCRIPTION OF THE DRAWINGS

Many aspects of the present backlight module can be better understood with reference to the following drawings. The components in the drawings are not necessarily to scale, the emphasis instead being placed upon clearly illustrating the principles of the present backlight module. Moreover, in the drawings, like reference numerals designate corresponding parts throughout the several views.

DETAILED DESCRIPTION OF PREFERRED EMBODIMENTS

Reference will now be made to the drawings to describe preferred embodiments of the present backlight module, in detail.

Figure 1:
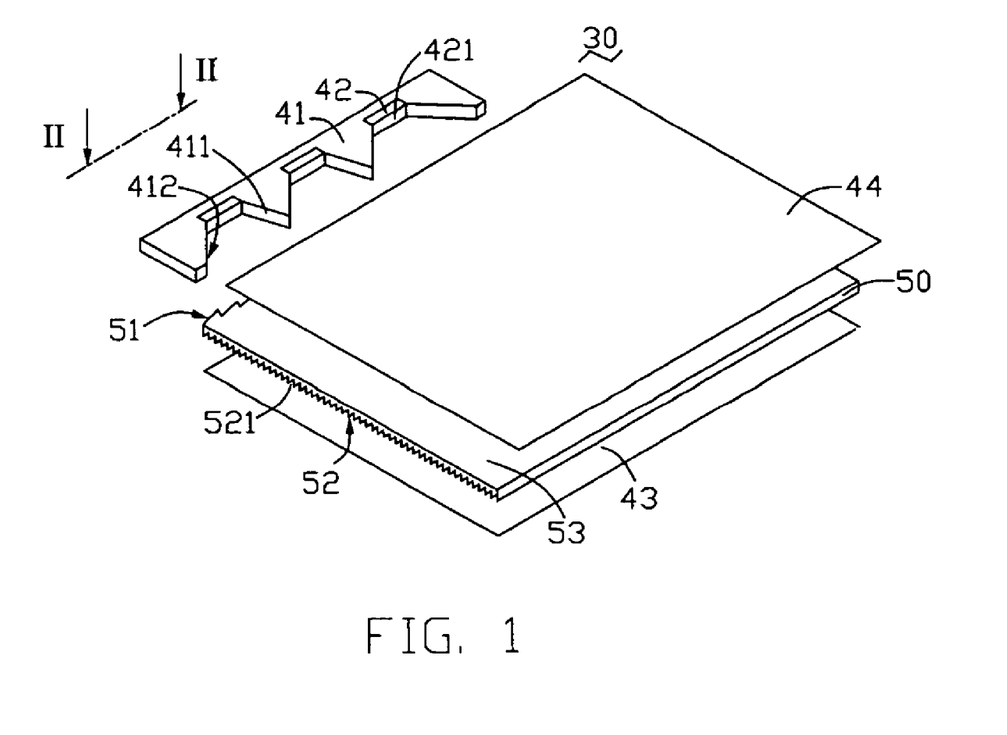
FIG. 1 is an exploded, perspective view of a backlight module in accordance with a first embodiment.

Referring to FIG. 1, an backlight module 30 in accordance with a first embodiment, is shown. The backlight module 30 includes a reflective cover 41, three light sources 42, an LGP 50, a reflective sheet 43, and an optical film 44. The light sources 42 are located in the reflective cover 41, and each light source 42 includes a light-emitting surface 421. The LGP 50 includes a light incidence surface 51, a light-emitting surface 53 connecting with the light incidence surface 51, and a bottom surface 52 opposite to the light-emitting surface 53. The light-emitting surface 421 of the light source 42 faces the light incidence surface 51 of the LGP 50. The reflective sheet 43, the LGP 50, and the optical film 44 are arranged in that order. The reflective sheet 43 can also be coated on the bottom surface 52.

A plurality of scattering-structures 521, such as v-shape cuts, is formed at the bottom surface 52. The scattering-structures 521 are uniform, and are oriented parallel to the light incidence surface 51. The light sources 42 are generally LEDs. The optical film 44 can be a diffusing sheet, a light condenser, or an assembly of the diffusing sheet and the light condenser.

The reflective cover 41 includes three reflective units. Each reflective unit includes two reflective surfaces 411, 412. The reflective surfaces 411, 412 face each other, and define a space therebetween. The light source 42 is accommodated in a bottom of the space. A metallic film, such as a silver film or an aluminum film, can be formed on the reflective surfaces 411, 412 to enhance the reflective efficiency thereof.

Figure 2:
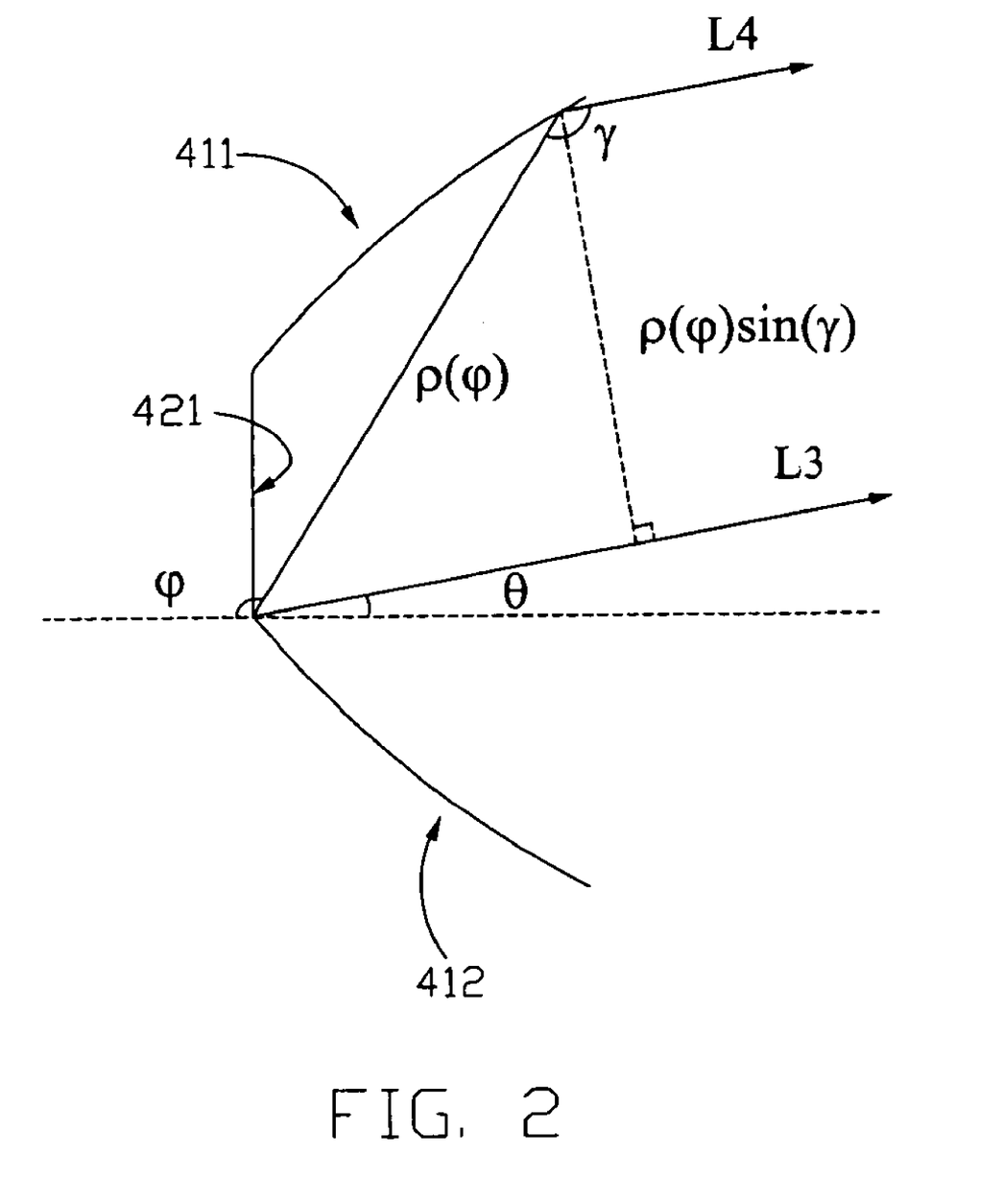
FIG. 2 is a cross-sectional view of reflective surfaces of a reflective cover of the backlight module, taken along line II—II of FIG. 1, showing a profile of the reflective surfaces in a polar coordinate.

Also referring to FIG. 2, a cross-sectional profile of the reflective surfaces 411, 412 is defined by an equation in a polar coordinate. The special-shaped reflective cover 41 can reflect light emitted from the light sources 42, and provide a uniform illuminating light to the light incidence surface 51 of the LGP 50. Thus, the backlight module 30 can provide a planar illuminating light with a uniform brightness to an LCD panel. The following is a detailed description of the cross-sectional profile of the reflective surfaces 411, 412.

As shown in FIG. 2, a bottom end point of the light-emitting surface 421 is located at an origin of the polar coordinate, and the cross-sectional profile of the reflective surfaces 411, 412 is represented by the polar coordinate $\rho(\phi)$. An edge ray L3 emitted from the bottom end point of the light-emitting surface 421 and an edge ray L4 reflected by the reflective surface 411 have a divergence angle $\theta$. The clockwise angle $\phi$ is a positive, and the anti-clockwise angle $\theta$ is a negative. The geometry of FIG. 2 shows that:

$$\gamma = \phi - \theta \quad (1)$$

and $$\frac{d\rho}{\rho d\phi} = \tan(\gamma/2) \quad (2)$$

From equations (1) and (2), the cross-sectional profile of the reflective surfaces 411, 412 can be written as:

$$\rho(\phi) = \rho_0 e^{\int_0^\phi \tan[(\phi-\theta)/2]d\phi} = \rho_0 \{\cos(\theta/2)/[\cos(\phi-\theta)/2]\}^2 \quad (3)$$

The angles $\gamma$ and $\theta$ satisfy the following relation:

$$\left\{ \begin{array}{l} \frac{\pi}{2} \leq \gamma \leq \pi \\ 0 \leq |\theta| \leq |\theta_{max}| \end{array} \right\} \quad (4)$$

Assuming that a light intensity is proportional to a distance between the two edge rays L3, L4, the intensity for the light source of unit brightness radiated in a certain direction is:

$$I^o(\theta) = \rho(\rho) \sin(\gamma) \quad (5)$$

For $\gamma \in [\frac{\pi}{2}, \gamma]$, the total power $P$ is:

$$p = \int_{\pi/2}^{\gamma} \rho(\phi)\sin(\gamma)d\gamma \quad (6)$$

For $\theta \in [\theta, 0]$, the same power P can be written as:

$$p = \int_0^\theta I^o(\theta)d\theta \quad (7)$$

The conservation of total energy implies:

$$\int_{\pi/2}^{\gamma} \rho(\phi)\sin(\gamma)d\gamma = \int_0^\theta I^o(\theta)d\theta \quad (8)$$

From equations (1), (2) and (8), the reflective surfaces 411, 412 outputting a certain intensity distribution $I^o(\theta)$ can be determined.

To produce a constant brightness on the light incidence surface 51 the LGP 50, the following intensity distribution must be satisfied:

$$I^o(\theta) = \frac{1}{\cos^2(\theta)} \quad (9)$$

Hence, the equation defining the cross-sectional profile of the reflective surfaces 411, 412 is obtained, as follow:

$$\left\{ \begin{array}{l} \int_{\pi/2}^{\phi-\theta} \rho(\phi)\sin(\phi-\theta)d(\phi-\theta) = \int_0^\theta \frac{1}{\cos^2(\theta)}d\theta \\ \rho(\phi) = \rho_0\{\cos(\theta/2)/[\cos(\phi-\theta)/2]\}^2 \end{array} \right. \quad (10)$$

Figure 3:
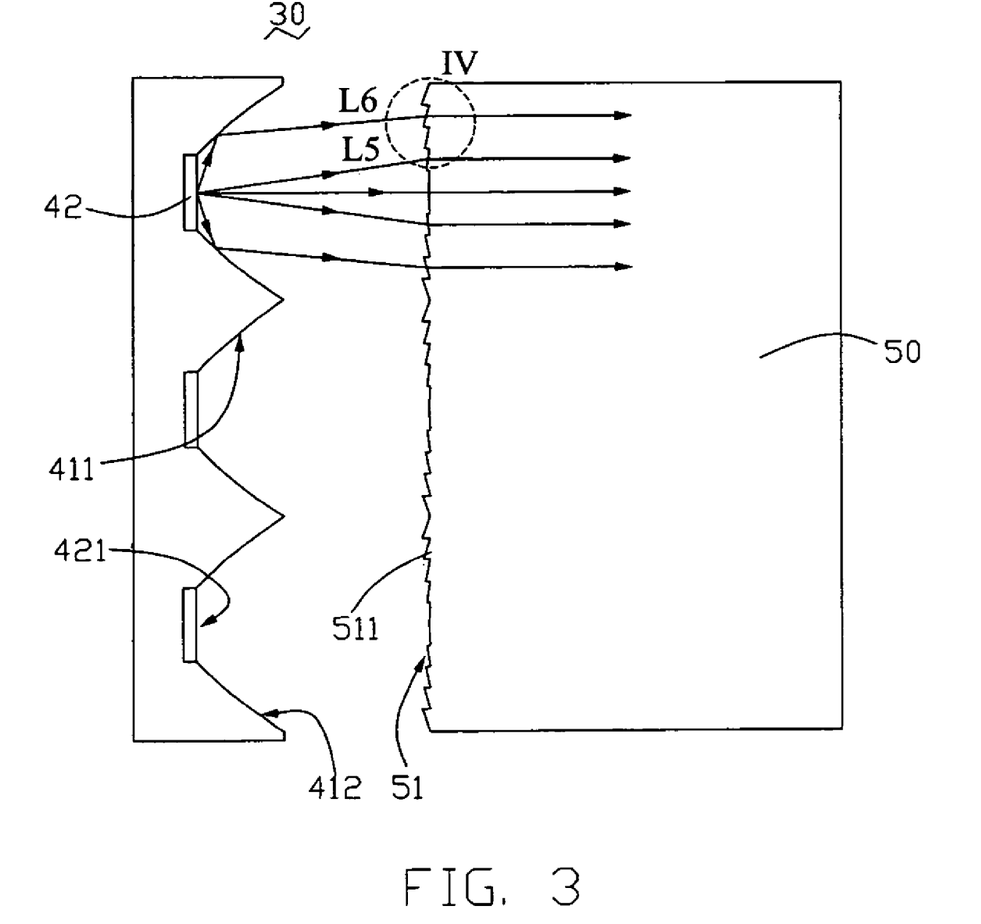
FIG. 3 is a plan view of the backlight module of FIG. 1, showing essential optical paths thereof.
Figure 4:
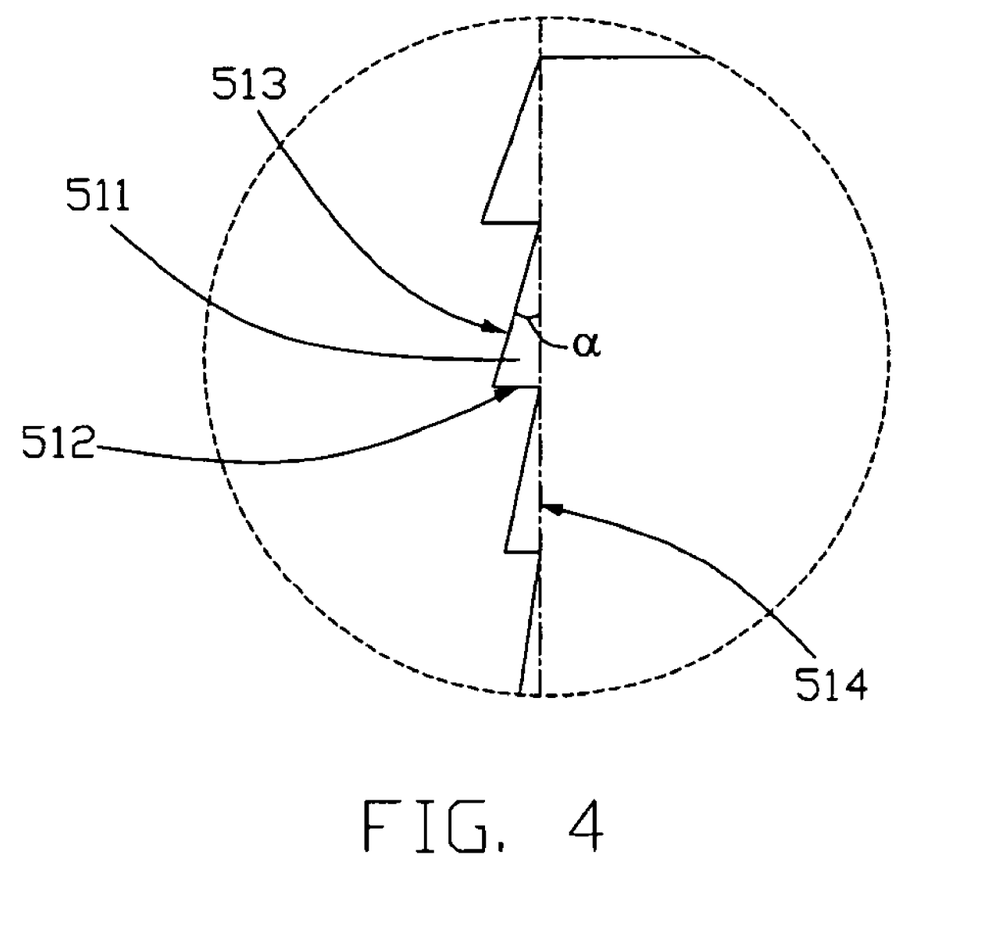
FIG. 4 is an enlarged view of a circled portion IV of FIG. 3.

Referring to FIGS. 3 and 4, a plurality of microstructures 511 is further formed at the light incidence surface 51. The microstructures 511 can form three one-dimensional fresnel lenses, each fresnel lens being opposite to a corresponding one of the three reflective units of the reflective cover 41. Each microstructure 511 includes a first surface 512 facing towards an axis perpendicular to a center of the light-emitting surface 421, and a second surface 513 facing away from the axis. The first surface 512 is perpendicular to a plane 514 parallel to the light-emitting surface 421. The second surface 513 and the plane 514 form an angle α. The angle α increases from a first portion opposite to the light source 42 to a second portion facing away from the light source 42.

In operation, light beam L5 emitted from the light source 42 directly incidents upon the microstructure 511. The microstructure 511 acts so as to make the light beam L5 be transmitted in the LGP 41 along a direction substantially perpendicular to the plane 514. Light beam L5 emitted from the light source 42 is firstly incident upon the reflective surface 411 and then is reflected onto the microstructure 511 by the reflective surface 411. The microstructure 511 also makes the light beam L6 transmit in the LGP 41 along the direction substantially perpendicular to the plane 514. Therefore, the reflective cover 41 and the microstructures 511 enables the backlight module 30 to provide a uniform planar illuminating light to an LCD panel.

Figure 5:
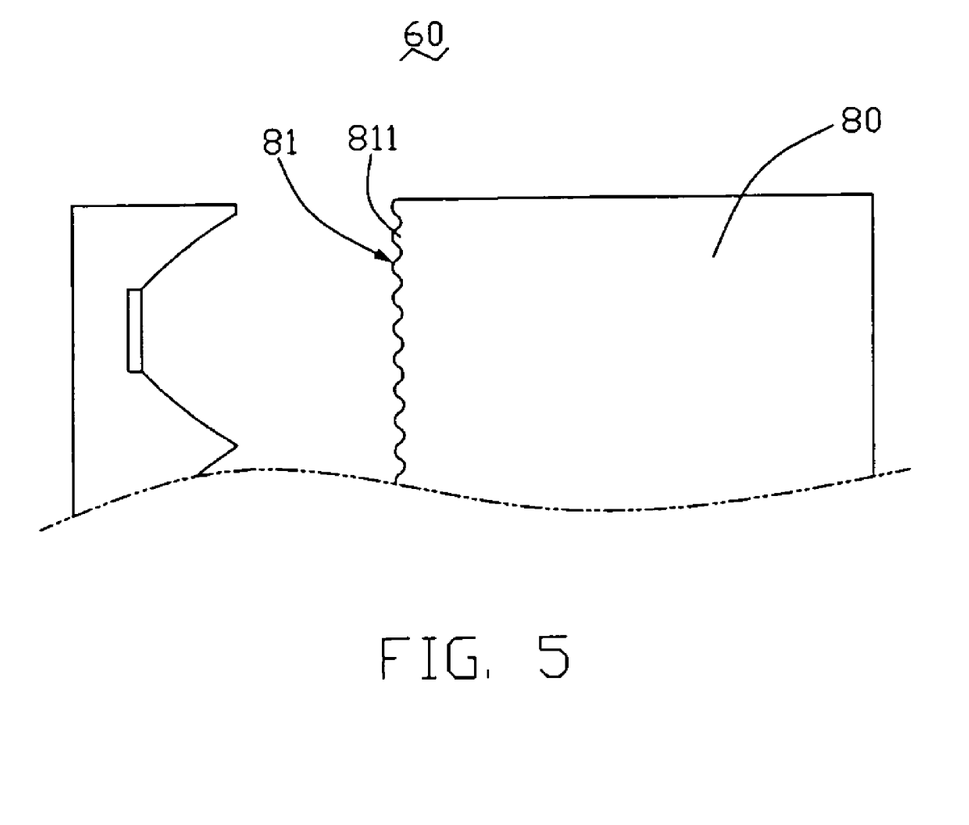
FIG. 5 is a partial, plan view of a backlight module in accordance with a second embodiment.

Referring to FIG. 5, a backlight module 60 in accordance with a second embodiment, is shown. The backlight module 60 is similar to the backlight module 30 of the first embodiment, and includes an LGP 80 with a light incidence surface 81. The difference is that a plurality of microstructures 811 are formed at the light incidence surface 81, and a cross-sectional line of the microstructures 811 is a sine wave.

It is to be understood that the above-described embodiments are intended to illustrate rather than limit the invention. Variations may be made to the embodiments without departing from the spirit of the invention as claimed. The above-described embodiments are intended to illustrate the scope of the invention and not restrict the scope of the invention.

What is claimed is:

1. A reflective cover, comprising:
at least one reflective unit comprising two reflective surfaces defining a space with a bottom for accommodating a light source, a cross-sectional profile of the reflective surfaces being defined by an equation in a polar coordinate $\rho(\phi)$:

$$\begin{cases} \int_{\pi/2}^{\varphi-\theta} \rho(\varphi)\sin(\varphi-\theta)d(\varphi-\theta) = \int_0^\theta \frac{1}{\cos^2(\theta)}d\theta \\ \rho(\varphi) = \rho_0\{\cos(\theta/2)/[\cos(\varphi-\theta)/2]\}^2, \end{cases}$$

wherein, $\rho$ represents a polar axis of the polar coordinate, $\phi$ represents a clockwise angle of the polar coordinate, and $\theta$ represents an anti-clockwise divergence angle of light emitted from the light source.

2. A backlight module, comprising:
a light source for emitting light;
a light guide plate comprising a light incidence surface, a light-emitting surface connecting with the light incidence surface, and a bottom surface opposite to the light-emitting surface, the light source facing the light incidence surface; and a reflective cover comprising a reflective unit, the reflective unit comprising two reflective surfaces defining a space with a bottom, the light source being accommodated in the bottom of the space, a cross-sectional profile of the reflective surfaces being defined by an equation in a polar coordinate $\rho(\phi)$, the equation being:

$$\begin{cases} \int_{\pi/2}^{\varphi-\theta} \rho(\varphi)\sin(\varphi-\theta)d(\varphi-\theta) = \int_0^\theta \frac{1}{\cos^2(\theta)}d\theta \\ \rho(\varphi) = \rho_0\{\cos(\theta/2)/[\cos(\varphi-\theta)/2]\}^2, \end{cases}$$

wherein, $\rho$ represents a polar axis of the polar coordinate, $\phi$ represents a clockwise angle of the polar coordinate, and $\theta$ represents an anti-clockwise divergence angle of the light.

3. The backlight module as claimed in claim 2, wherein the light source is a light-emitting diode.

4. The backlight module as claimed in claim 2; wherein a metallic film is formed on the reflective surface.

5. The backlight module as claimed in claim 4, wherein the metallic film is a silver film.

6. The backlight module as claimed in claim 4, wherein the metallic film is an aluminum film.

7. The backlight module as claimed in claim 2, wherein a plurality of microstructures are formed at the light incidence surface.

8. The backlight module as claimed in claim 7, wherein the microstructures form a one-dimensional fresnel lenses opposite to the reflective unit of the reflective cover.

9. The backlight module as claimed in claim 8, wherein the microstructure comprises a first surface adjacent to an axis perpendicular to a center of the light-emitting surface and a second surface away from the axis, the first surface being perpendicular to a plane parallel to the light-emitting surface, the second surface and the plane forming an angle a increasing from a first portion opposite to the light source to a second portion away from the light source.

10. The backlight module as claimed in claim 7, wherein a cross-sectional line of the microstructures is a sine wave.

11. The backlight module as claimed in claim 2, wherein a plurality of scattering-structures are formed at the bottom surface.

12. The backlight module as claimed in claim 11, wherein the scattering-structure is a v-shape cut.

13. The backlight module as claimed in claim 2, further comprising a reflective sheet positioned under the bottom of the light guide plate.

14. The backlight module as claimed in claim 2, further comprising a reflective film coated on the bottom of the light guide plate.

15. The backlight module as claimed in claim 2, further comprising an optical film positioned on the light-emitting surface of the light guide plate.

16. The backlight module as claimed in claim 15, wherein the optical film is a diffusing sheet.

17. The backlight module as claimed in claim 15, wherein the optical film is a light condenser.

18. The backlight module as claimed in claim 15, wherein the optical film is an assembly including both a diffusing sheet and a light condenser.

* * * * *